US011633939B2

(12) United States Patent
Baser

(10) Patent No.: US 11,633,939 B2
(45) Date of Patent: Apr. 25, 2023

(54) METHOD FOR PRODUCING A PLANAR COMPOSITE COMPONENT AND COMPOSITE COMPONENT PRODUCED THEREBY

(71) Applicant: QUADRANT PLASTIC COMPOSITES AG, Lenzburg (CH)

(72) Inventor: Burak Baser, Aarburg (CH)

(73) Assignee: QUADRANT PLASTIC COMPOSITES, AG, Lenzburg (CH)

( * ) Notice: Subject to any disclaimer, the term of this patent is extended or adjusted under 35 U.S.C. 154(b) by 118 days.

(21) Appl. No.: 16/500,529

(22) PCT Filed: Apr. 3, 2018

(86) PCT No.: PCT/EP2018/058473
§ 371 (c)(1),
(2) Date: Mar. 11, 2021

(87) PCT Pub. No.: WO2018/185090
PCT Pub. Date: Oct. 11, 2018

(65) Prior Publication Data
US 2021/0197519 A1    Jul. 1, 2021

(30) Foreign Application Priority Data
Apr. 3, 2017   (EP) .................................... 17164504

(51) Int. Cl.
*B32B 5/26*    (2006.01)
*B32B 5/02*    (2006.01)
(Continued)

(52) U.S. Cl.
CPC .............. *B32B 5/26* (2013.01); *B29B 13/022* (2013.01); *B29C 70/345* (2013.01); *B32B 5/022* (2013.01);
(Continued)

(58) Field of Classification Search
CPC ................................. B32B 5/26; B32B 5/022
(Continued)

(56) References Cited

U.S. PATENT DOCUMENTS 8,540,830 B2    9/2013   Brentrup et al.
2006/0244170 A1*  11/2006  Brentrup ................ D04H 1/544
264/122

(Continued)

FOREIGN PATENT DOCUMENTS

DE          19520477 A1    12/1996
EP          1714772 A1    10/2006
(Continued)

OTHER PUBLICATIONS

PCT International Search Report Application No. PCT/EP2018/058473, dated Jun. 1, 2018 and English Translation.

*Primary Examiner* — Tahseen Khan
(74) *Attorney, Agent, or Firm* — Brooks Kushman P.C.

(57) ABSTRACT

A method for producing a planar composite component having a core layer (B), which is arranged between and integrally bonded to two cover layers (A, A'), wherein the cover layers contain a cover-layer thermoplastic and wherein the core layer contains a core-layer thermoplastic, comprises the following steps:
a) a heated stack with layer sequence A-B-A' is provided;
b) the heated stack (A-B-A') is pressed;
c) the pressed stack is cooled, whereby the planar composite component with consolidated layers integrally bonded to each other is formed.
To improve the production method including the producibility of planar 3D components, it is proposed, that
at least one of the cover layers (A, A') in unconsolidated form comprises a fibrous nonwoven layer of 10 to 100 wt.-% thermoplastic fibers of the cover-layer thermo-
(Continued)

plastic and 0 to 90 wt.-% of reinforcing fibers having an areal weight of 300 to 3,000 g/m$^2$;

the core layer (B) in unconsolidated form comprises at least one randomly-oriented-fiber nonwoven layer (D) formed from reinforcing fibers and thermoplastic fibers of the core-layer thermoplastic, and that after the pressing the consolidated core layer(s) has/have an air pore content of <5 vol.-% and the consolidated core layer has an air pore content of 20 to 80 vol-%.

15 Claims, 3 Drawing Sheets

(51) Int. Cl.
| | |
|---|---|
| B29B 13/02 | (2006.01) |
| B29C 70/34 | (2006.01) |
| B32B 37/10 | (2006.01) |
| B32B 37/08 | (2006.01) |
| B32B 37/04 | (2006.01) |
| B32B 37/18 | (2006.01) |
| B32B 7/02 | (2019.01) |
| B32B 27/12 | (2006.01) |

(52) U.S. Cl.
CPC .............. *B32B 7/02* (2013.01); *B32B 37/04* (2013.01); *B32B 37/08* (2013.01); *B32B 37/10* (2013.01); *B32B 37/185* (2013.01); *B29C 2793/0081* (2013.01); *B32B 27/12* (2013.01); *B32B 2250/20* (2013.01); *B32B 2250/22* (2013.01); *B32B 2262/101* (2013.01); *B32B 2262/106* (2013.01); *B32B 2305/02* (2013.01); *B32B 2305/08* (2013.01); *B32B 2305/10* (2013.01); *B32B 2307/718* (2013.01); *B32B 2307/72* (2013.01); *B32B 2309/02* (2013.01)

(58) Field of Classification Search
USPC .......................................................... 428/73
See application file for complete search history.

(56) References Cited

U.S. PATENT DOCUMENTS

| | | | | |
|---|---|---|---|---|
| 2008/0160272 | A1* | 7/2008 | Brentrup | B32B 27/32 156/99 |
| 2015/0030804 | A1* | 1/2015 | Baser | B29C 39/203 428/114 |
| 2015/0044438 | A1* | 2/2015 | Baser | D04H 3/04 156/243 |
| 2021/0347158 | A1* | 11/2021 | Zogg | B32B 5/26 |
| 2021/0354436 | A1* | 11/2021 | Baser | B32B 7/09 |
| 2021/0370624 | A1* | 12/2021 | Schimanski | B32B 5/26 |

FOREIGN PATENT DOCUMENTS

| | | |
|---|---|---|
| EP | 2 636 783 A1 | 9/2013 |
| WO | 2006/105682 A1 | 10/2006 |
| WO | 2006/133586 A1 | 12/2006 |

* cited by examiner

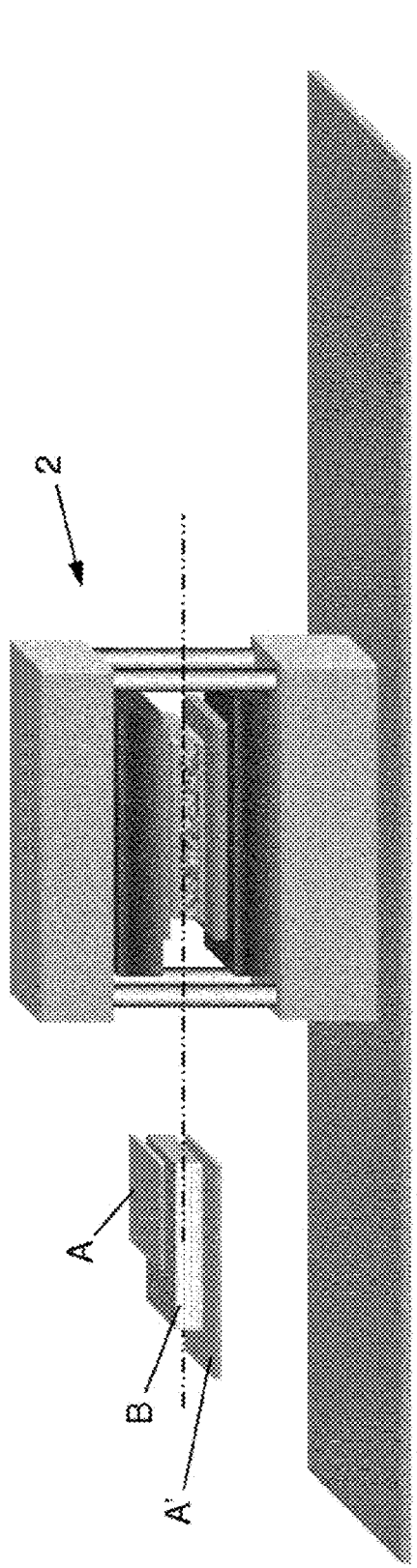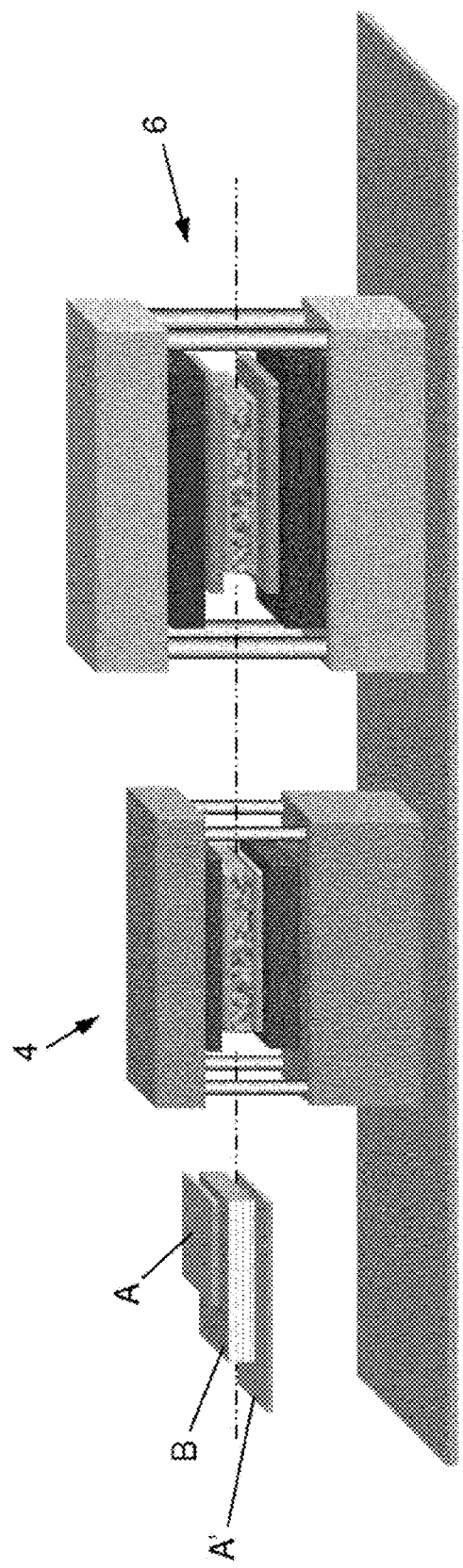

METHOD FOR PRODUCING A PLANAR COMPOSITE COMPONENT AND COMPOSITE COMPONENT PRODUCED THEREBY

CROSS-REFERENCE TO RELATED APPLICATIONS

This application is a U.S. national phase of PCT Application No. PCT/EP2018/058473 filed on Apr. 3, 2018, which claims priority to European Patent Application No. EP 17164504.7 filed on Apr. 3, 2017, the disclosures of which are incorporated in their entirety by reference herein.

FIELD OF THE INVENTION

The present invention relates to a method for producing a planar composite component having a core layer, which is arranged between and integrally bonded to two cover layers.

Moreover, the invention relates to a planar composite component produced by the meth-od of the present invention and also to a use thereof.

BACKGROUND OF THE INVENTION

Composite components made of fiber-reinforced thermoplastics are increasingly used as molded parts in various fields of technology.

For example, WO 2015/117799A1 describes a composite component comprising a foam core, on the surface of which a cover layer is arranged and integrally bonded to both sides of the foam core. For producing the composite component, the cover layers and the foam core are heated, then the cover layers are positioned on the surfaces of the foam core, and the whole is placed into a press or mold which is shaped as the finished composite component. The heating can also be done in the mold only. Subsequently, the foam core and the outer layers are molded and then cooled after a certain molding time, whereby an integral connection between foam core and cover layers is formed. As possible cover layers are mentioned, on the one hand, metallic cover layers, particularly of aluminum. Alternatively, cover layers of fiber-reinforced plastic are also described. Because during the molding step the cover layers can be displaced on the surfaces of the foam core, the described method proves to be advantageous particularly for the production of non-planar composite components with a complex shape.

A related composite component and a method for its production are described in WO 2006/133586 A1. This relates to a flexurally rigid composite sheet, comprising:

A. one or two cover layers with a thickness of 0.5 to 5 mm made of glass fiber reinforced polypropylene with a glass content of 20 to 60 wt.-% and a content of air pores of less than 5 vol.-%, and B. a core layer with a thickness of 2 to 40 mm made of glass fiber reinforced polypropylene with a glass content of 35 to 80 wt.-% and a content of air pores of 20 to 80 vol.-%.

In the described production method, the core layer to be used is provided as a porous plate, which, as described for example in WO 2006/105682 A1, can be prepared by dry blending of polypropylene fibers and glass fibers, needling of the blended nonwoven and hot pressing. As cover layers, conventional glass mat thermoplastic plates (commonly termed as "GMT plates") are provided. The reinforcing fibers of the cover layers as well as of the core layer are already impregnated with thermoplastics prior to the production of the flexurally rigid composite sheet by an upstream heating and pressing process, and subsequently stored as a flexurally rigid plate element. For producing the actual composite sheet, the layers to be pressed are then provided as plates, stacked on top of each other in a press and pressed at temperatures between 180 and 220° C. for 5 to 50 min. The describe composite sheets are used, in particular, as partition walls and boarding elements in construction industry, but also in furniture construction as a substitute for chipboard.

Production of a flexurally rigid composite component with the method described above, in which the cover and core layer are provided as already consolidated and rigid plates, requires a total of nine process steps, namely:
Provision of the core layer(s): 1) production of nonwoven, 2) impregnation of the reinforcing fibers in a hot press (under pressure & temperature), 3) consolidation in a cooling press;
Provision of the cover layers: 1) mat production, 2) extrusion, 3) impregnation in a hot press, 4) consolidation in a cooling press;
Production of the composite plate: 1) heating of the cover layers and core layer in a hot press, 2) cooling of the cover layers and core layer.

DE 195 20 477 A1 describes fiber-reinforced GMT plates which expand on heating due to the restoring forces of the glass mats and contain unevenly distribute air bubbles. For the production of such GMT panels, corresponding glass mats are first produced. Subsequently, the glass mats are impregnated with layers of extruded polypropylene melt or with polypropylene foils in a hot press, and then consolidated in a cooling press. The GMT plates so prepared are reheated after consolidation—when required—in order to effect the desired expansion. The expanded GMT plates to be used as a support core can be pressed together with cover layers to form a sandwich molded part. The manufacturing method also described in DE 195 20 477 A1 is based on thermal pressing of a support core, which is cooled to room temperature and consequently solidified together with external layers provided as unexpanded GMT foils.

For producing a flexurally rigid composite component according to the method of DE 195 20 477 A1 it is even necessary to carry out twelve process steps, namely:
Provision of the core layer(s): 1) mat production, 2) extrusion of the melt layer on mats, 3) impregnation of the reinforcing fibers in a hot press (under pressure & temperature), 4) consolidation in a cooling press, 5) heating of the consolidated core layers, so that they expand, 6) cooling of the core layers;
Provision of the cover layer(s): 1) mat production, 2) extrusion, 3) impregnation in a hot press, 4) consolidation in a cooling press;
Production of the composite plate: 1) heating of the cover layers, 2) pressing of the cover layers with cold core layer; therefore, the production is limited to planar plates, for 3D parts, the cores would have to be molded accordingly in a preceding additional step, and then pressed with cover layers.

There is still a considerable need for further, particularly for flexurally rigid, planar and, if required, three-dimensionally shaped composite components, but also for corresponding, simple and economical manufacturing processes. In particular, methods are desired for producing composite components with properties that are significantly improved for particular applications.

DESCRIPTION OF THE INVENTION

An object of the invention is therefore to provide a method for producing a planar composite component. A further object of the invention is to provide a corresponding composite component and to specify uses thereof.

These objects are achieved by the production method defined in claim 1 and by the planar composite component defined in claim 14 and by the uses thereof defined in claim 16.

Advantageous embodiments of the invention are described below and defined in the dependent claims.

The method of the present invention for producing a planar composite component having a core layer (B), which is arranged between and integrally bonded to two cover layers (A, A'), wherein the cover layers contain a cover-layer thermoplastic and wherein the core layer contains a core-layer thermoplastic, comprises the following steps:
a) providing corresponding pre-cut parts of the two cover layers and of the core layer and forming therefrom a stack with layer sequence A-B-A which is heated to a temperature above the melting temperature of both the cover-layer thermoplastic and the core-layer thermoplastic;
b) the heated stack (A-B-A') is pressed;
c) the pressed stack is cooled, whereby the planar composite component with consolidated layers integrally bonded to each other is formed.

Due to the fact that
in step a) the initially provided pre-cut parts of the two cover layers (A, A') are provided in unconsolidated flexible form, at least one cover layer (A) comprising an unconsolidated flexible fibrous nonwoven layer (C) of 10 to 100 wt.-% thermoplastic fibers of the cover-layer thermoplastic and 0 to 90 wt.-% of reinforcing fibers having an areal weight of 300 to 3000 g/m$^2$, and that
in step a) the initially provided pre-cut parts of the core layer (B) comprise at least one randomly-oriented-fiber nonwoven layer (D) formed from reinforcing fibers and thermoplastic fibers of the core-layer thermoplastic having an areal weight of 500 to 10,000 g/m$^2$, and that
after step c) the consolidated cover layer(s) has/have an air pore content of <5 vol.-% and the consolidated core layer has an air pore content of 20 to 80 vol-%,
various advantages arise from the method of the present invention.

In particular, the method of the present invention also allows the production of specifically molded, non-flat planar components (also called "3D components"). Moreover, due to a good drapability of the provided cover layer and core layer with flexible layers of fibrous nonwovens, high degrees of deformation can be achieved.

Furthermore, the method of the present invention may be implemented in a process-economical manner, i.e. with advantageously short process time and/or with comparatively low energy consumption. In the method of the present invention, thermoplastic impregnation of the reinforcing fibers only occurs upon component production. Accordingly, in comparison with WO 2006/133586 A1 and DE 195 20 477 A1, significantly fewer process steps are required, namely only three:
  Provision of the core layers: 1) production of the randomly-oriented-fiber nonwoven;
  Provision of the cover layers: 1) fibrous nonwoven layer production, preferably with woven;
  Production of the composite component: 1) heating and cooling in a variable temperature pressing tool (in one step).

Due to their layer arrangement, the planar composite components of the present invention are also referred to as "sandwich components". Such components may be formed as flat or bent plates, but also as components with variable thickness and deformation degree.

In the present context, the term "corresponding pre-cut parts" is to be understood with regard to the dimensions of the composite component to be produced. A "corresponding pre-cut part" of the material for one of the cover layers will therefore substantially have the length and width of the composite component. In the case of a "corresponding pre-cut part" of the material for the core layer, this will also be applicable, but any additional structural layers provided in certain embodiments will have to be also considered, i.e. included. Furthermore, the term "pre-cut part" does not necessarily imply the part to be provided in one piece.

In the present context, the term "initially provided" is to be understood in particular in respect of step a). Said step a) starting from the initially provided materials leads to a heated stack A-B-A', which in principle can be achieved in various manners, as will be explained henceforth.

The term "consolidated" is to be understood in the context with the pressing step provided in the present invention. Therefore, "consolidated" is not necessarily to be understood as "fully consolidated" or "poreless", but rather as a state which results from pressing in a hot condition.

In contrast, the term "in unconsolidated form" is to be understood as a reference state for starting materials in which no substantial formation of a thermoplastic matrix has occurred yet.

The terms "cover-layer thermoplastic" and "core-layer thermoplastic" are principally to be understood as a specification of the particular thermoplastic from which the thermoplastic fibers present in the respective layers are formed. This does not necessarily require that the thermoplastic fibers in a given layer need to be formed from a single thermoplastic material. In particular, also mixed fibers of different, but compatible thermoplastics can be used. Compatible" shall be understood to refer to thermoplastics which allow formation of an integral bonding. Similarly, it is not excluded that two different cover-layer thermoplastics are used in the two cover layers A and A'.

It will be understood that in respect to the pressing process according to step b) the term "heated" is to be understood in the sense that a temperature suitable for thermoplastic molding has been established. Therefore, any thermoplastic regions intended to be molded should be heated to a temperature slightly above the respective thermoplastic melting temperature.

Depending on the thermoplastic material used, pressing is carried out at temperatures in the range of about 180° C. (for example when using polypropylene) to about 400° C. (for example when using PEEK) and at pressures of 0.5 to 5 bar. Processing is carried out variothermally (i.e. by heating and pressing within the same mold) or by prior heating in a contact oven, IR oven or circulating air oven followed by subsequent pressing in the mold. According to the invention, the initially provided pre-cut parts of the two cover layers (A, A') are provided in unconsolidated flexible form. The initially provided pre-cut parts of the at least one cover layer (A) comprise an unconsolidated flexible fibrous nonwoven layer (C) of 10 to 100 wt.-% thermoplastic fibers of the cover-layer thermoplastic and of 0 to 90 wt.-% of reinforcing fibers, wherein the fibrous nonwoven layer (C) as a whole has an areal weight of 300 to 3,000 g/m$^2$. If this only applies to one of the two layers A and A', then this is defined to apply to layer A without limitation of generality. In this last-mentioned case, the further layer A' comprises, for example, a structure containing thermoplastic fibers and optionally reinforcing fibers, which structure is also provided in unconsolidated flexible form.

In contrast to the foam cores used in WO 2015/117799 A1, the core layer (B) in unconsolidated form of the present invention comprises at least one randomly-oriented-fiber nonwoven layer (D) formed from reinforcing fibers and thermoplastic fibers. Such layers are also referred as "nonwovens".

Moreover, according to the present invention, it is ensured that after pressing the consolidated cover layer(s) has/have an air pore content of <5 vol.-% and that the consolidated core layer has an air pore content of 20 to 80 vol-%. This results in components with a resistant, relatively hard and stiff outer layer and a voluminous, sound and heat insulating inner layer with a comparatively low density. Accordingly, the components are relatively lightweight for a given stiffness.

To a significant extent, the above-mentioned structure results from the fact that upon pressing of the previously provided heated stack, the consolidation process initially takes place primarily in the layers A and possibly A' near the surface, whereas in the region of the core layer a less extensive consolidation takes occurs as a consequence of restoring forces exerted by the randomly oriented fiber layer.

In the pressed component, the cover layers have a thickness of 0.1 mm to 10 mm, while the core layer has a thickness of 0.5 mm to 50 mm. The cover layers and core layer of nonwovens preferably have the same matrix or mutually compatible matrices, so that adhesion occurs integrally and without additional adhesive foils or adhesive.

The randomly-oriented-fiber nonwoven layers made of thermoplastic fibers as a matrix and, optionally, of reinforcing fibers, which are used in the core layer have the advantage that they are flexible and can have a considerably greater thickness (4× to 8×, possibly even up to 10×) than the final thickness in the pressed component. In sandwich production, the core layer of nonwovens is compressed to the final thickness. In contrast to foamed plastics, the method of the present invention bears no risk that the core of nonwoven could collapse under the effect of temperature and pressure and thus cause the required thicknesses not to be achieved. This is achieved by the fact that the reinforcing fibers of the nonwovens provide a resistance in z direction (i.e., perpendicular to the layer plane) under pressure and heat conditions during the pressing process, which manifests itself as an "expansion force". Due to the constantly present "expansion force" during the entire pressing process, thicknesses up to 4× times the fully consolidated thickness can be achieved (without collapsing).

In an advantageous embodiment (claim 2), the randomly-oriented-fiber nonwoven layer (D) of the core layer (B) provided in step a) is needled. As a result, the restoring effect being also referred to in technical term as "loft" is enhanced in z direction. Thereby, the expansion forces of the fibers can be influenced depending on fiber content, fiber length and needling parameters.

In principle, for the method of the present invention a plurality of of proven thermoplastics are available, the selection of which is within the scope of specialist knowledge. According to an advantageous embodiment (claim 3), the cover-layer thermoplastic and the core-layer thermoplastic are independently selected from polypropylene (PP), polyetherimide (PEI), polyetheretherketone (PEEK), polyphenylene sulfide (PPS), polyamide (PA), polyaryletherketone (PAEK), Polyether ketone ketone (PEKK) and polycarbonate (PC).

For the selection of the reinforcing fibers there is also a plurality of proven fiber materials available. According to an advantageous embodiment (claim 4), the reinforcing fibers are selected from carbon fibers, glass fibers, aramid fibers, basalt fibers, and high-melting thermoplastic fibers. The term "high-melting thermoplastic fibers" refers to fibers made of a thermoplastic having a melting point above the working temperatures used in the heating and pressing process of the present invention.

It will be understood that the selection of the thermoplastics as well as of the fiber materials, and accordingly also the combination of thermoplastic and fiber material, are strongly influenced by the application field of the component to be produced.

According to an advantageous embodiment of the method (claim 5), in step a) the provided pre-cut parts of the two cover layers (A, A') and the core layer (B) are stacked onto each other in the cold state with layer sequence A-B-A', and the stack (A-B-A') thus formed is heated to a temperature above the melting temperature of both the cover-layer thermoplastic and the cover-layer thermo-plastic. In this embodiment, starting from cold pre-cut parts, the stack A-B-A' is initially built and heated as a whole. Subsequently, the heated stack is pressed in step b) in a compression mold and cooled in step c). The shape of the compression mold is selected depending on the desired shape of the component to be produced. For this embodiment, the cover-layer thermoplastic and core-layer thermoplastic have to be compatible with each other, so that their thermoplastic deformation is simultaneously possible in a suitable temperature range. For carrying out the method, it is possible to use, for example, a combined heating, pressing and cooling station (so-called variothermal process). However, it is also possible, to carry out the heating process in an independent contact heating station and to carry out the subsequent pressing and cooling in a follow-up pressing device. According to an advantageous embodiment of this method (claim 6), the cover-layer thermoplastic and the core-layer thermoplastic are identical. As a result, the adhesion of the individual layers to one another can be effected integrally and without additional adhesive foils or adhesive.

A long-proven, cost-effective and reliable material combination is based on polypropylene as a thermoplastic and glass as the material of the reinforcing fibers. As a higher-quality material combination with mechanically outstanding properties and comparatively low weight, PEEK or PEI as thermoplastics and carbon fibers as the material of the reinforcing fibers can be used. Carbon fibers also offer the advantage of a stronger restoring force, i.e. a stronger loft effect, which favors the production of components with a highly porous core layer.

According to another advantageous embodiment of the method (claim 7), in step a) the pre-cut parts of the core layer (B) and of the two cover layers (A, A') are heated independently of one another to a temperature above the melting temperature of the corresponding thermoplastic and then stacked onto each other in the heated state with layer sequence A-B-A'. In this case as well, a heated stack (A-B-A') is formed. Due to the independent heating processes, the various layers can be heated to different temperatures, which may be required, in particular, when using different core layer and cover-layer thermoplastics.

It will be understood that in all embodiments, the pressing step of the heated stack has to be carried out promptly, i.e. no early solidification of the thermoplastic shall occur. Accordingly, in the last-mentioned embodiment, it is preferable to provide dedicated heating stations for independently heating the cover layers and the core layer so as to enable a parallel operation.

According to an advantageous embodiment (claim 8), the at least one cover layer (A) in unconsolidated form comprises a woven layer or an oriented-fiber layer (E) comprising reinforcing fibers, which has an areal weight of 100 to 2,000 g/m$^2$ and which is needled, stitched or thermally connected to the fibrous nonwoven layer (C). Such laminates have been described in WO 2006/111037 A1 and are known, for example, under the term "Q-Tex". According to an advantageous embodiment of this method (claim 9), the at least one cover layer (A) comprises several woven layers or oriented-fiber layers (E1, E2, etc.) comprising different reinforcing fiber materials. For example, a first layer may be provided with carbon fibers, a second layer with aramid fibers, and a third layer with glass fibers.

The cover layers can also be formed of of several layers with different orientations, in order to achieve a resistant structure in respect to rigidity and ductility. For example, a glass fiber layer with an orientation of +45° and −45°, respectively and a further layer with unidirectional glass fibers can be provided.

According to a further advantageous embodiment (claim 10), the core layer (B) in unconsolidated form comprises at least one further structural layer (F) adjacent to the randomly-oriented-fiber nonwoven layer (D), which may be in particular a further randomly-oriented-fiber nonwoven layer with a different content of reinforcing fibers or else a honeycomb layer or a foamed plastic layer. In certain embodiments, the structural layer is formed from a thermoplastic, in particular from the cover-layer thermoplastic. According to one embodiment (claim 11), the structural layer (F) is provided only in selected regions of the core layer. In other embodiments, structural layers made of materials with a higher melting point such as aluminum or Nomex® are used.

With the aforementioned measures, which can be implemented individually or in combination, a considerable, "tailor made" variability of the local properties of the component is made possible.

According to an advantageous embodiment of the method (claim 12), the pressing of the heated stack is carried out in a non-planar pressing tool. As a result, 3-dimensionally structured planar composite components of various types can be produced.

A further aspect of the invention (claim 13) relates generally to a planar composite component having a core layer (B), which is arranged between and integrally bonded to two cover layers (A, A'), wherein the composite component is produced by the method of the present invention. According to an advantageous embodiment (claim 14), PEEK is correspondingly used as a cover-layer thermoplastic and as a core-layer thermoplastic, and the reinforcing fibers are carbon fibers, with the cover layers (A, A') having a density of 1.0 to 2.0 g/cm$^3$, particularly of 1.3 to 1.8 g/cm$^3$, and with the core layer (B) having a density of 0.2 to 1.0 g/cm$^3$, particularly of 0.3 to 0.6 g/cm$^3$. According to a further embodiment (claim 15). PEI is correspondingly used as a cover-layer thermoplastic and as a core-layer thermoplastic.

The planar composite components of the present invention have multiple application fields. According to one aspect of the invention (claim 16), the composite components of the present invention are used in aeronautic or automotive manufacturing.

BRIEF DESCRIPTION OF THE DRAWINGS

Examples of the invention will henceforth be described in more detail by reference to the drawings, which show;

FIG. 6 a combined heating, pressing and cooling device for processing a layer stack, in a schematic, perspective view;

FIG. 7 a device with a heating station and a follow-up pressing and cooling device for processing a layer stack, in a schematic, perspective view.

MODES FOR CARRYING OUT THE INVENTION

Only to clarify the layer structure, the planar composite components of FIGS. 1 to 5 are shown with layers offset in the longitudinal direction. In practical use, however, the individual layer edges are usually arranged in justified manner. Moreover, FIGS. 1 to 5 are intended to illustrate the principal layer structure only, and not relative thicknesses of the layers. Accordingly, the arrangements shown in FIGS. 1 to 5 basically represent both each provided layer stack and also the composite components formed after the pressing process.

Figure 1:
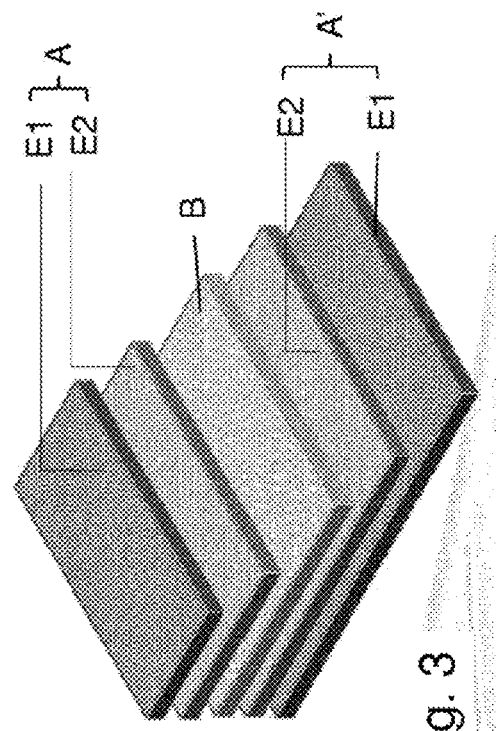
FIG. 1 a first planar composite component, in a schematic, perspective view.

The composite component shown in FIG. 1 comprises a core layer B which is arranged between two cover layers A and A'.

Figure 2:
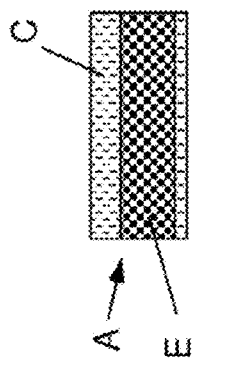
FIG. 2 an embodiment of an unconsolidated cover layer, in a schematic sectional view.

A possible embodiment of the cover layer A is illustrated in FIG. 2. It comprises, in its initially provided form, a fibrous nonwoven layer C and a woven layer E made of reinforcing fibers which is needled therewith. Such a layer can be produced, for example, by adjacently laying out and needling of the layers C and E, with a part of the nonwoven fibers C being pushed through the reinforcing fiber layer E during needling. Accordingly, the reinforcing fiber layer E is surrounded on both sides by nonwoven fibers C.

Figure 3:
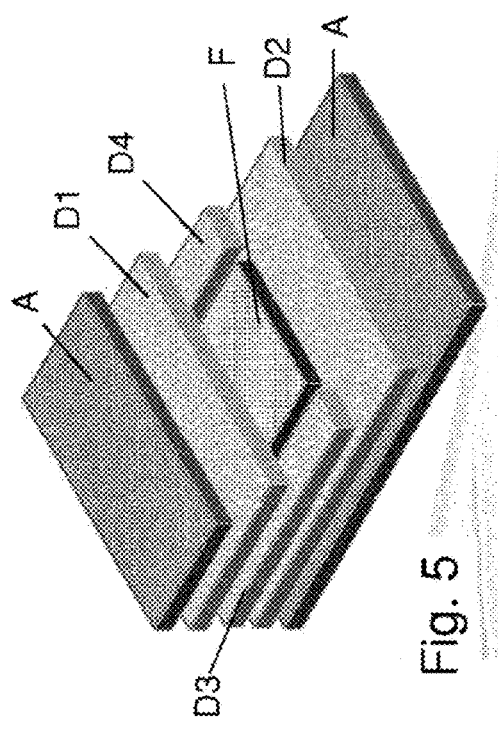
FIG. 3 a second planar composite component, in a schematic, perspective view.

In the composite component shown in FIG. 3, each of the two cover layers A and A' is formed from two woven layers E1 and E2 comprising different reinforcing fiber materials.

Figure 4:
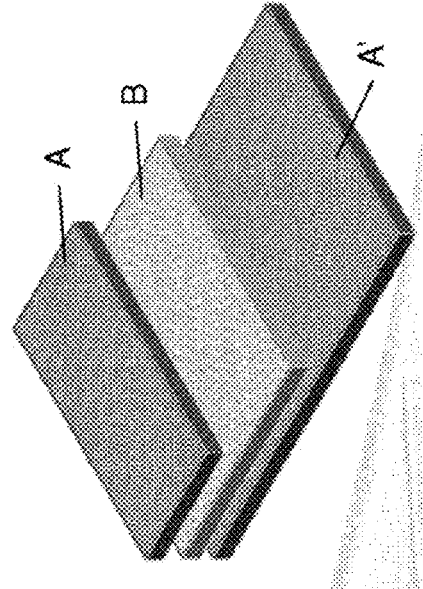
FIG. 4 a third planar composite component, in a schematic, perspective view.

In the composite component shown in FIG. 4, the core layer B in its unconsolidated form comprises at both sides thereof a structure layer F with the shape of a honeycomb plate or of a randomly oriented fiber layer with a different content of reinforcing fibers arranged in the interior of the randomly-oriented-fiber nonwoven layer D. In the example shown, the structural layer is formed so as to cover the whole area and is thus embedded in sandwich-like manner between two randomly oriented fiber layers.

Figure 5:
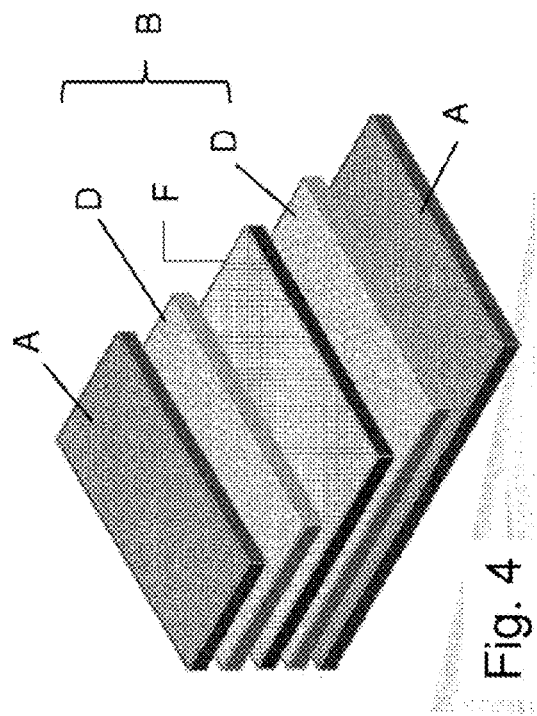
FIG. 5 a fourth planar composite component, in a schematic, perspective view.

In the composite component shown in FIG. 5, the structure layer F is present only in selected regions of the core layer B. As shown in FIG. 5, in the example shown the structure layer F is arranged as a central strip in the interior of the core layer B and is embedded between upper and lower randomly-oriented-fiber nonwoven layers D1 and D2 and between lateral randomly-oriented-fiber nonwoven layers D3 and D4.

In an embodiment of the production method, as shown in FIG. 6, an initially provided cold layer stack A-B-A' is introduced into a combined heating, pressing and cooling device 2, where it is heated and pressed to a planar composite component.

In a further embodiment, as illustrated in FIG. 7, a previously provided flexible cold layer stack A-B-A' is introduced into a contact heating device 4 where it is heated. The heated layer stack thus formed is subsequently pressed to a planar composite component in a pressing device 6.

Figure 8:
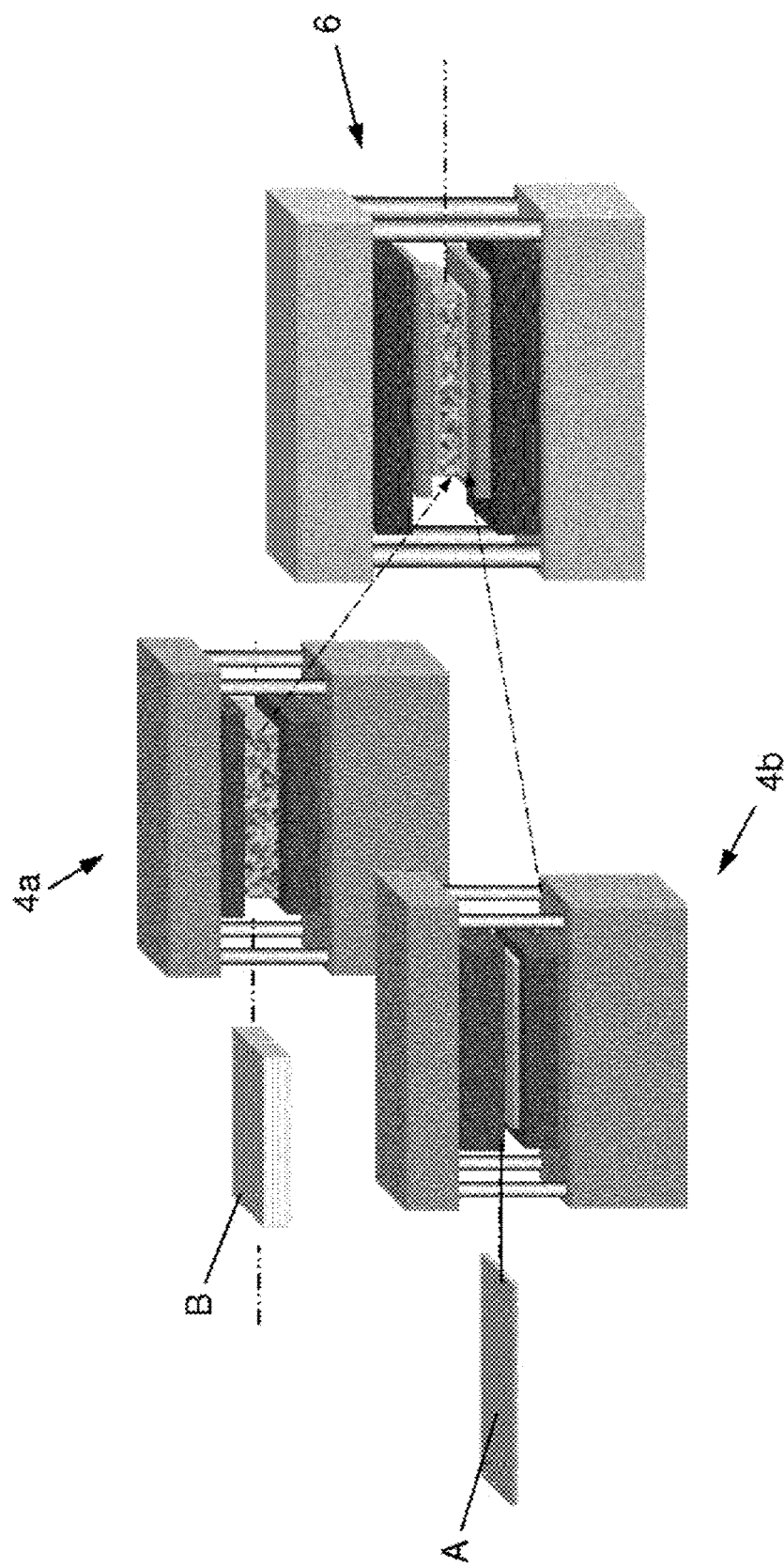
FIG. 8 a device with separate heating stations for individual layers and a follow-up pressing and cooling device for processing a layer stack, in a schematic, perspective view.

In still another embodiment, as illustrated in FIG. 8, a core layer B in non-consolidated form, which in the example shown consists of several layers, is introduced into a first heating device 4a where it is heated. At substantially the same time, a cover layer A in unconsolidated form is introduced into a contact heating device 4b where it is also heated. A further cover layer A', not shown, is also heated either in a third heating device or immediately afterwards in the second heating device. From the heated cover layers and core layers thus formed, a hot stack A-B-A is formed, which is subsequently pressed to a planar composite component in the pressing device 6. By using separate heating devices, different heating temperatures can be used for the core layer B on the one hand and for the cover layers A and A' on the other hand. This allows the use of different thermoplastic materials in the core layer and in the cover layers.

Example 1: Remarks on Maximum Fiber Contents and Thicknesses

The following table gives an overview of correlated quantities for various combinations of PP and PEEK as thermoplastics and for glass fibers (GF) and carbon fibers (CF) as reinforcing fibers:

TABLE 1

| Content of reinforcing fibers | | | Percentage weight proportion | | | Percentage volume proportion |
|---|---|---|---|---|---|---|
| | | 0% | 10% | 90% | 75% |
| PP-GF density | | g/cm3 | 0.9 | 0.963 | 2.187 | 2.187 |
| PP-GF weight proportion | | — | 0 | 0.1 | 0.897 | 0.897 |
| PP-GF volume proportion | | — | 0 | 0.037 | 0.7499 | 0.7499 |
| Thicknesses at given areal weights (g/m2) | | | | | | |
| | 300 | mm | 0.33 | 0.31 | 0.14 | 0.14 |
| | 3000 | mm | 3.33 | 3.12 | 1.37 | 1.37 |
| PP-CF density | | g/cm3 | 0.9 | 0.947 | 1.638 | 1.575 |
| PP-CF weight proportion | | — | 0 | 0.1 | 0.9 | 0.857 |
| PP-CF volume proportion | | — | 0 | 0.0526 | 0.8182 | 0.75 |
| Thicknesses at given areal weights (g/m2) | | | | | | |
| | 300 | mm | 0.33 | 0.32 | 0.18 | 0.19 |
| | 3000 | mm | 3.33 | 3.17 | 1.83 | 1.90 |
| PEEK-GF density | | g/cm3 | 1.3 | 1.368 | 2.364 | 2.275 |
| PEEK-GF weight proportion | | — | 0 | 0.1 | 0.9 | 0.857 |
| PEEK-GF volume proportion | | — | 0 | 0.526 | 0.8182 | 0.7498 |
| Thicknesses at given areal weights (g/m2) | | | | | | |
| | 300 | mm | 0.23 | 0.22 | 0.13 | 0.13 |
| | 3000 | mm | 2.31 | 2.19 | 1.27 | 1.32 |
| PP-GF density | | g/cm3 | 1.3 | 0.9257 | 1.733 | 1.675 |
| PEEK-CF weight proportion | | — | 0 | 0.1 | 0.9 | 0.806 |
| PEEK-CF volume proportion | | — | 0 | 0.0743 | 0.8667 | 0.75 |
| Thicknesses at given v (g/m2) | | | | | | |
| | 300 | mm | 0.23 | 0.32 | 0.17 | 0.18 |
| | 3000 | mm | 2.31 | 3.24 | 1.73 | 1.79 |

Density g/cm3
PP 0.9
PEEK 1.3
GF 2.6
CF 1.8 wherein the following relationship were used for calculation:
Volume proportions:

$$V_F = \frac{W_F}{D_F \cdot \left(\frac{W_F}{D_F} + \frac{W_P}{D_P}\right)}$$

with:
VF Volume proportion of the fibers
WF Weight proportion of the fibers
WP Weight proportion of the polymer
DF Density of the fibers (kg/m3)
DP Density of the polymer (kg/m3)
Density:

$$D_C = V_F \cdot D_F + (1 - V_F) \cdot D_P$$

with:
DC Density to the composite (kg/m3)
Thickness:

$$t_C = \frac{A_C}{D_C}$$

with:
tC Thickness to the composite (m)
AC Areal weight to the composite

It should be noted that due to geometrical reasons the volume proportions amount to a maximum of 79% in the case of a square arrangement and to a maximum of 91% in case of a hexagonal arrangement. In Table 1 above, a maximum fiber volume proportion of 75% was assumed.

Example 2: Composite Component with a Constant Thickness

A flexurally rigid composite component according to the present invention and having the layer structure A-B-A was produced. The two cover layers A were each provided from a fibrous nonwoven pre-cut part made of carbon fibers and PEI thermoplastic fibers having an areal weight of 440 g/m2. The core layer B was provided from a total of four layers of a randomly-oriented-fiber nonwoven made of carbon fibers with PEI thermoplastic fibers having an areal weight of 4×500 g/m2.

The non-planar flexurally rigid composite component thus produced had a thickness of about 4 mm, an areal weight of 2,880 g/m2 and a density of 0.7 g/m3.

Example 3: Composite Component Having Areas of Different Thickness

A composite component according to the invention and having the layer structure A-B-A was produced. The two cover layers A were each provided from a fibrous nonwoven precut part made of carbon fibers and PEI thermoplastic fibers having an areal weight of 440 g/m2. The core layer B was provided from a total of seven layers of a randomly-oriented-fiber nonwoven made of carbon fibers with PEI thermoplastic fibers having an areal weight of 7×500 g/m2.

The flexurally rigid composite component having regions of different thickness thus produced had a thickness of about 3.5 mm in the more strongly consolidated regions and a thickness of about 8 mm in the in the less strongly consolidated regions. The areal weight was 4,380 g/m2 and the density was 1.26 g/m3 and 0.55 g/m3 in the more strongly and the less strongly consolidated regions, respectively.

Example 4: Results of Material Testing

The following table shows measured mechanical properties of various composite components according to the present invention.

TABLE 2

| Layer structure *) A-B-A | 1x 2x 1x | 1x 5x 1x | 1x 5x 1x | 1x 5x 1x | 1x 6x 1x | 2x 6x 2x |
|---|---|---|---|---|---|---|
| Density (g/cm3) | 0.34 | 0.43 | 0.43 | 0.62 | 0.72 | 1.01 |
| Thickness (mm) | 4.9 | 4.9 | 5.7 | 4.86 | 4.87 | 4.54 |
| Areal weight (g/m2) | 1,880 | 2,380 | 2,380 | 3,380 | 3,380 | 4,760 |
| Flexural rigidity 0° (MPa) | 8.2 | 28.4 | 22.6 | 74 | 94 | 195 |
| Flexural rigidity 90° (MPa) | | | | 82 | 164 | 208 |
| Flexural rigidity E module 0° (MPa) | 1,351 | 4,285 | 3,100 | 6,381 | 8,245 | 17,173 |
| Flexural rigidity E module 90° (MPa) | | | | 8,178 | 12,313 | 18,271 |

*) Cover layers A with CF woven and PEI matrix, core layer made of CF randomly-oriented-fibers and PEI matrix

The invention claimed is:

1. A method for producing a planar composite component having a core layer (B) arranged between and integrally bonded to two cover layers (A, A'), wherein the cover layers contain a cover-layer thermoplastic and wherein the core layer contains a core-layer thermoplastic, comprising the following steps:
   a) providing corresponding pre-cut parts of the two cover layers and of the core layer and forming therefrom a stack with layer sequence A-B-A' is heated to a temperature above the melting temperature of both the cover-layer thermoplastic and the core-layer thermoplastic;
   b) pressing the heated stack A-B-A;
   c) cooling the pressed stack, whereby the planar composite component with consolidated layers integrally bonded to each other is formed; and
   wherein
   in step a) the initially provided pre-cut parts of the two cover layers (A, A') are provided in unconsolidated flexible form, at least one cover layer (A) comprising an unconsolidated flexible fibrous nonwoven layer (C) of 10 to 100 wt.-% thermoplastic fibers of the cover-layer thermoplastic and 0 to 90 wt.-% of reinforcing fibers having an areal weight of 300 to 3000 g/m², and
   in step a) the initially provided pre-cut parts of the core layer (B) comprise at least one randomly-oriented-fiber nonwoven layer (D) formed from reinforcing fibers and thermoplastic fibers of the core-layer thermoplastic, and having an areal weight of 500 to 10,000 g/m², and
   after step c) the consolidated cover layer(s) has/have an air pore content of <5 vol.-% and the consolidated core layer has an air pore content of 20 to 80 vol-%.

2. The method of claim 1, wherein the randomly-oriented-fiber nonwoven layer (D) of the core layer (B) provided in step a) is needled.

3. The method of claim 1, wherein the cover-layer thermoplastic and the core-layer thermoplastic are independently selected from the group consisting of PP, PEI, PEEK, PPS, PA, PEAK, PEKK, PC, and mixtures thereof.

4. The method of claim 1, wherein the reinforcing fibers are selected from the group consisting of carbon fibers, glass fibers, aramid fibers, basalt fibers, high-melting thermoplastic fibers, and mixtures thereof.

5. The method of claim 1, wherein in step a) the pre-cut parts of the two cover layers (A, A') and the core layer (B) are stacked onto each other in a cold state with layer sequence A-B-A', and the stack (A-B-A') thus formed is heated to a temperature above the melting temperature of both the cover-layer thermoplastic and the cover-layer thermoplastic, whereby a heated stack (A-B-A') is formed to then carry out the pressing step b).

6. The method of claim 5, wherein the cover-layer thermoplastic and the core-layer thermoplastic are identical.

7. The method of claim 1, wherein in step a) the pre-cut parts of the core layer (B) and of the cover layers (A, A') are heated independently of one another to a temperature above the melting temperature of the corresponding thermoplastic, and then stacked onto each other in the heated state with layer sequence A-B-A to form a heated stack (A-B-A') which is then subjected to the pressing step b).

8. The method of claim 1, wherein the at least one cover layer (A) in unconsolidated form comprises a woven layer or an oriented-fiber layer (E) comprising reinforcing fibers, which has an areal weight of 100 to 2,000 g/m² and which is needled, stitched or thermally connected to the fibrous nonwoven layer (C).

9. The method of claim 8, wherein the at least one cover layer (A) comprises several woven layers or oriented-fiber layers comprising different reinforcing fiber materials.

10. The method of claim 1, wherein the core layer (B) in unconsolidated form comprises at least one further structural layer (F) which is adjacent to the randomly-oriented-fiber nonwoven layer (D).

11. The method of claim 1, wherein the core layer (B) in unconsolidated form comprises at least one further structural layer (F) which is adjacent to the randomly-oriented-fiber nonwoven layer (D) and is further randomly-oriented-fiber nonwoven layer with a different content of reinforcing fibers, a honeycomb layer, or a foamed plastic layer.

12. The method of claim 10, wherein the structural layer (F) is provided only in selected regions of the core layer.

13. The method of claim 1, wherein the pressing of the heated stack (A-B-A') is carried out in a non-planar pressing tool.

14. The method of claim 1, wherein the cover-layer thermoplastic and the core-layer thermoplastic are PEEK, wherein the reinforcing fibers are carbon fibers, and wherein the cover layers (A, A') have a density of 1.0 to 2.0 $g/cm^3$, and wherein the core layer (B) has a density of 0.2 to 1.0 $g/cm^3$.

15. The method of claim 1, wherein the cover-layer thermoplastic and the core-layer thermoplastic are PEI, wherein the reinforcing fibers are carbon fibers, and wherein the cover layers (A, A') have a density of 1.0 to 2.0 $g/cm^3$, wherein the core layer (B) has a density of 0.2 to 1.0 $g/cm^3$.

* * * * *

UNITED STATES PATENT AND TRADEMARK OFFICE
CERTIFICATE OF CORRECTION

PATENT NO. : 11,633,939 B2
APPLICATION NO. : 16/500529
DATED : April 25, 2023
INVENTOR(S) : Burak Baser Page 1 of 1

It is certified that error appears in the above-identified patent and that said Letters Patent is hereby corrected as shown below:

In the Claims

Column 12, Lines 46-47, Claim 5:
After "melting temperature of both the cover-layer thermoplastic and the"
Delete "cover-layer" and
Insert -- core-layer --.

Signed and Sealed this
Twenty-seventh Day of February, 2024

Katherine Kelly Vidal
*Director of the United States Patent and Trademark Office*